US012771972B2

(12) United States Patent
Furuta et al.

(10) Patent No.: US 12,771,972 B2
(45) Date of Patent: Oct. 20, 2026

(54) DATA MEASUREMENT SYSTEM AND METHOD OF PRESENTING MEASUREMENT DATA

(71) Applicant: Shimadzu Corporation, Kyoto (JP)

(72) Inventors: Masafumi Furuta, Kyoto (JP); Koichi Murata, Kyoto (JP); Koki Yoshida, Kyoto (JP); Yasuyuki Uraoka, Kyoto (JP); Kahori Kise, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 555 days.

(21) Appl. No.: 18/014,291

(22) PCT Filed: May 11, 2021

(86) PCT No.: PCT/JP2021/017850
§ 371 (c)(1),
(2) Date: Jan. 3, 2023

(87) PCT Pub. No.: WO2022/009515
PCT Pub. Date: Jan. 13, 2022

(65) Prior Publication Data
US 2023/0254610 A1 Aug. 10, 2023

(30) Foreign Application Priority Data
Jul. 6, 2020 (JP) ................................ 2020-116405

(51) Int. Cl.
*H04Q 9/04* (2006.01)
*G01D 9/00* (2006.01)

(52) U.S. Cl.
CPC ................ *H04Q 9/04* (2013.01); *G01D 9/00* (2013.01)

(58) Field of Classification Search
CPC .................................. H04Q 9/04; G01D 9/00
(Continued)

(56) References Cited

U.S. PATENT DOCUMENTS 7,072,813 B2 7/2006 Billemaz et al.
8,540,629 B2 * 9/2013 Jain ........................ G16H 40/67 600/300
(Continued)

FOREIGN PATENT DOCUMENTS

CN 102880071 A 1/2013
CN 104270567 A 1/2015
(Continued)

OTHER PUBLICATIONS

Office Action dated Mar. 14, 2024 for application No. CN 202180069873.6.
(Continued)

*Primary Examiner* — Aditya S Bhat
(74) *Attorney, Agent, or Firm* — Muir Patent Law, PLLC

(57) ABSTRACT

A data measurement system (10) includes a plurality of measurement apparatuses (130), a signal transmitter (110), and a data processing apparatus (150). The signal transmitter (110) transmits a trigger signal to the plurality of measurement apparatuses (130). The data processing apparatus (150) obtains from each of the plurality of measurement apparatuses (130), measurement data measured during a period between a start signal corresponding to the trigger signal transmitted at first time and an end signal corresponding to the trigger signal transmitted at second time later than the first time. The data processing apparatus (150) temporally aligns start signals in the obtained data with each other and aligns end signals in the obtained data with each other, and presents the measurement data from the plurality of measurement apparatuses (130) to a user.

12 Claims, 7 Drawing Sheets

(58) Field of Classification Search
USPC .......................................................... 702/188
See application file for complete search history.

(56) References Cited

U.S. PATENT DOCUMENTS

| | | | | |
|---|---|---|---|---|
| 8,891,942 | B2 * | 11/2014 | Shah | G06T 7/248 386/280 |
| 8,981,942 | B2 * | 3/2015 | He | A61B 5/18 340/576 |
| 9,884,330 | B2 | 2/2018 | Humpal et al. | |
| 10,872,044 | B1 | 12/2020 | Campbell | |
| 2018/0078754 | A1 | 3/2018 | Perez et al. | |
| 2019/0020949 | A1 | 1/2019 | Uchida | |
| 2019/0251989 | A1 * | 8/2019 | Kondo | G04G 5/04 |
| 2020/0064847 | A1 | 2/2020 | Zhang et al. | |

FOREIGN PATENT DOCUMENTS

| | | | |
|---|---|---|---|
| JP | 5-316047 | A | 11/1993 |
| JP | 2014-128452 | A | 7/2014 |
| JP | 2017-199980 | A | 11/2017 |
| JP | 2019-21966 | A | 2/2019 |
| JP | 2019-041156 | A | 3/2019 |
| WO | 2017-221968 | A1 | 12/2017 |

OTHER PUBLICATIONS

PCT Written Opinion of the International Searching Authority (Form PCT/ISA/237) for PCT application No. PCT/JP2021/038228 dated Jan. 18, 2022.

Notice of Reasons for Refusal dated Feb. 27, 2024 for counterpart application No. JP 2022-534922.

Reconsideration Report by Examiner before Appeal dated Nov. 27, 2024, for Japanese Patent Application No. 2022-534922.

Creact Corporation, CAPTIV-L7000 solution ‘CAPTIV(Software and Wireless Sensors)’ (2017).

Creact Corporation, CAPTIV-L7000 solution ‘CAPTIV(Wireless Sensors and Measurements)’ (2017).

PCT Written Opinion of the International Searching Authority (Form PCT/ISA/237), for PCT application No. PCT/JP2021/017850, dated Aug. 17, 2021.

Tobii Corporate, Tobii Pro Glasses 2 User’s Manual, version 1.1.3, (Nov. 2020) downloaded from https://www.tobiipro.com/siteassets/tobii-pro/user-manuals/tobii-pro-glasses-2-user-manual.pdf/?v=1.1.3.

Extended European Search Report dated Jun. 18, 2024 for corresponding application No. EP 21837587.

Decision of Refusal dated Jul. 30, 2024, for corresponding Japanese Patent Application No. 2022-534922.

Office Action dated Jun. 23, 2025, issued from the State Intellectual Property Office of People’s Republic of China, for corresponding application Application No. 202180047886.3 (and English-language machine translation thereof).

Notice of Reasons for Refusal dated May 13, 2025, issued from the Japanese Patent Office, for corresponding Application No. 2022-534922 (and English-language machine translation thereof).

Second Office Action dated Feb. 4, 2026, for corresponding application No. CN 202180047886.3, and English language machine translation thereof.

Office Action dated May 25, 2026, for corresponding application No. CN 202180047886.3 (and English-language machine-translation of the same).

* cited by examiner

DATA MEASUREMENT SYSTEM AND METHOD OF PRESENTING MEASUREMENT DATA

TECHNICAL FIELD

The present invention relates to a data measurement system and a method of presenting measurement data, and more particularly to a technology to present pieces of data measured by a plurality of measurement apparatuses, as being in synchronization on a time-series basis.

BACKGROUND ART

Studies about analysis of human's operations have recently been conducted. For example, Non-Patent Literature (NPL 1) below introduces a system for visualizing postures during works based on a plurality of motion sensors and biological sensors attached to a worker and images during works by the worker. The system shown in NPL 1 aims to improve productivity by improving work environments by recognizing and analyzing loads imposed on the worker during works.

NPL 2 discloses an eye tracker representing an exemplary biological sensor applicable to a system as above. The eye tracker disclosed in NPL 2 includes an input terminal for an external signal for starting and quitting measurement.

CITATION LIST

Non-Patent Literature

NPL 1: Creact Corporation, CAPTIV-L7000 solution, https://www.creact.co.jp/item/measure/ergonomics/captiv-17000/17000-top NPL 2: Tobii Corporate, Tobii Pro Glasses 2 User's Manual, https://www.tobiipro.com/siteassets/tobii-pro/user-manuals/tobii-pro-glasses-2-user-manual.pdf/?v=1.1.3

SUMMARY OF INVENTION

Technical Problem

In operation analysis as above, it is important to know relation on a time-series basis among image information for recording operations of a subject, biological information representing a state of the subject, such as a body temperature and pulses, and environmental information representing a state of an environment where the subject is located, such as an air temperature and noise. Such information is often obtained by individual measurement apparatuses such as a camera, a biological sensor, and a temperature and humidity sensor.

In order to synchronize pieces of measurement data obtained by a plurality of measurement apparatuses on a time-series basis, for example, a time stamp based on a time counting function of each measurement apparatus may be referred to and the obtained measurement data may be synchronized based on identicalness of time indicated by the time stamps. In this case, all of independently operating measurement apparatuses rarely match in time with each other, and not little offset of time from actual time may be caused in the measurement apparatuses.

Regarding also a clock frequency of a clock signal for a time counting function of each measurement apparatus, there may be not little error in clock frequency of an oscillator for generating a clock signal. Therefore, even when there is no offset of start time between measurement apparatuses, time indicated by the same clock number may be different for each measurement apparatus. Then, even when the measurement apparatuses match in start time with each other, in particular as a measurement period becomes longer, deviation in time between pieces of measurement data may become larger and a degree of association between pieces of data may lower.

In order to address such a problem, a common control device may control all of sensors and cameras included in the system in a centralized manner to thereby ensure synchronicity between pieces of measurement data. In such a system, however, dedicated control device and sensors/cameras should be prepared. Then, a commercially available sensor or the like cannot be employed, which may result in poorer general applicability, and additionally, a large-scale and expensive system.

The present invention was made to solve problems as above, and an object thereof is to, in a system that collects and presents pieces of measurement data obtained from a plurality of measurement apparatuses, synchronize on a time-series basis the obtained measurement data with a relatively simplified technique.

Solution to Problem

A data measurement system according to one aspect of the present invention includes a plurality of measurement apparatuses, a transmitter, and a data processing apparatus. The transmitter transmits a first signal to the plurality of measurement apparatuses. The data processing apparatus presents to a user, data obtained from the plurality of measurement apparatuses. The data processing apparatus obtains from each of the plurality of measurement apparatuses, measurement data measured during a period between a start signal corresponding to the first signal transmitted at first time and an end signal corresponding to the first signal transmitted at second time later than the first time. The data processing apparatus temporally aligns start signals in the obtained data with each other and end signals in the obtained data with each other, and presents the measurement data from the plurality of measurement apparatuses to the user.

A method according to another aspect of the present invention relates to a method of presenting measurement data to a user in a data measurement system including a plurality of measurement apparatuses. The data measurement system includes a transmitter and a data processing apparatus. The method includes i) transmitting, by the transmitter, a first signal to the plurality of measurement apparatuses, ii) obtaining, by the data processing apparatus, from each of the plurality of measurement apparatuses, measurement data measured during a period between a start signal corresponding to the first signal transmitted at first time and an end signal corresponding to the first signal transmitted at second time later than the first time, and iii) temporally aligning, by the data processing apparatus, start signals in the obtained data with each other and end signals in the obtained data with each other and presenting the measurement data from the plurality of measurement apparatuses to the user.

Advantageous Effects of Invention

According to the data measurement system according to the present invention, measurement data during a period from the start signal to the end signal based on the first signal (a trigger signal) transmitted from a common transmitter is obtained from each of a plurality of measurement apparatuses, and pieces of obtained measurement data are presented to the user with the start signals being temporally aligned with each other and with the end signals being temporally aligned with each other. By thus aligning the pieces of measurement data with each other with the start signal and the end signal being defined as the reference to synchronize the plurality of pieces of measurement data on a time-series basis in the measurement apparatuses, accuracy in synchronization of the measurement data can be enhanced. Furthermore, by using the trigger signal in common, a commercially available sensor or the like could be employed for a measurement apparatus with an external input, and hence a system can relatively readily be constructed.

DESCRIPTION OF EMBODIMENTS

Figure 1:
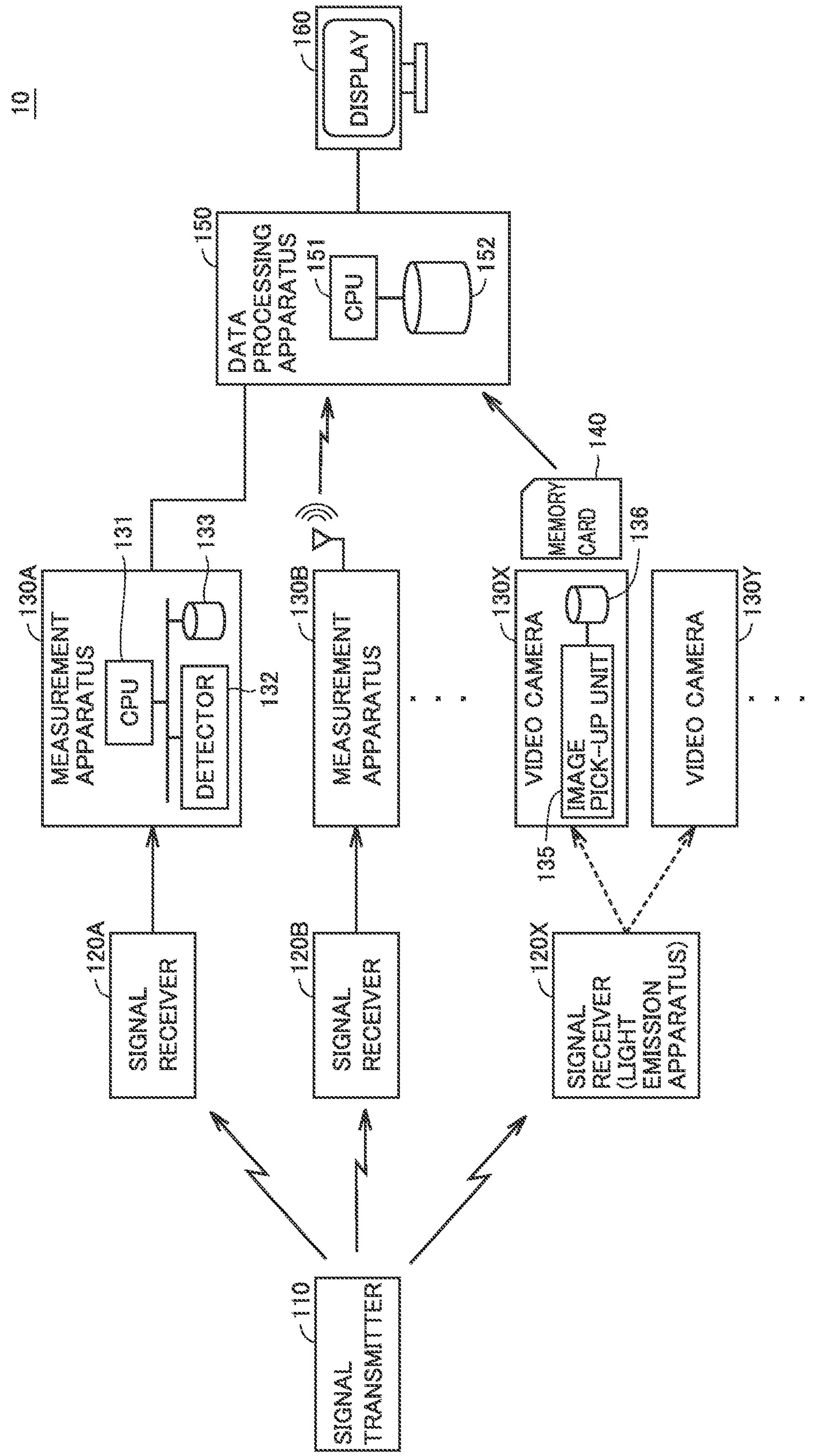
FIG. 1 is an overall block diagram of a data measurement system according to an embodiment.

An embodiment of the present invention will be described in detail below with reference to the drawings. The same or corresponding elements in the drawings have the same reference characters allotted and description thereof will not be repeated.

Configuration of Data Measurement System

FIG. 1 is an overall block diagram of a data measurement system 10 according to an embodiment. Referring to FIG. 1, data measurement system 10 includes a signal transmitter 110, a plurality of signal receivers 120A, 120B, and 120X (which will also comprehensively be referred to as a "signal receiver 120" below), measurement apparatuses 130A and 130B, video cameras 130X and 130Y, a data processing apparatus 150, and a display 160. In the description below, measurement apparatuses 130A and 130B and video cameras 130X and 130Y will also comprehensively be referred to as a "measurement apparatus 130." Data measurement system 10 shows measurement data including image data obtained from a plurality of measurement apparatuses 130, as being in synchronization on a time-series basis. The data measurement system is used, for example, for observing and analyzing association between an event experienced by a subject or an object to be observed, and status change that occurs in the subject or the object caused by the event.

Signal transmitter 110 transmits a trigger signal (a first signal) to be used for synchronization between pieces of measurement data from the plurality of measurement apparatuses 130. Signal transmitter 110 simultaneously transmits (broadcasts) a pulsed trigger signal, for example, through wireless communication and/or wired communication. In the present embodiment, the trigger signal is not an activation signal and a measurement start signal for each measurement apparatus, but a signal for specifying a subject measurement period in each measurement apparatus. The trigger signal is transmitted at the time of start and end of the subject measurement period. Basically, the trigger signal is issued while each measurement apparatus 130 is active and is conducting measurement. The trigger signal is not necessarily limited to a pulsed signal, but may be a signal having a specific pattern such as a sinusoidal wave or a packet signal containing ID data for identification.

Signal receiver 120 is configured to receive the trigger signal transmitted from signal transmitter 110. In response to reception of the trigger signal, signal receiver 120 transmits a marker signal (a second signal) corresponding to the trigger signal to measurement apparatus 130.

In the example in FIG. 1, signal receiver 120A is connected to measurement apparatus 130A and signal receiver 120B is connected to measurement apparatus 130B. In this case, signal receivers 120A and 120B transmit the received trigger signals to measurement apparatuses 130A and 130B, respectively. When the trigger signal is a pulsed signal, signal receiver 120 transfers the received trigger signal as it is to measurement apparatus 130. When the trigger signal is a signal in a form other than the pulsed signal, signal receiver 120 converts the trigger signal into a pulsed signal and transmits the pulsed signal to measurement apparatus 130.

The signal receiver does not have to individually be arranged for each measurement apparatus but a signal from a single signal receiver may be transmitted to two or more measurement apparatuses. As will be described later, in measurement apparatuses 130A and 130B, signals transmitted from signal receivers 120A and 120B are stored in respective storage devices 133 together with measurement data on a time-series basis.

Signal receiver 120X is a light emission apparatus and includes a light emitter (not shown) such as an LED. Signal receiver 120X turns on or off the light emitter in response to reception of the trigger signal. When the measurement apparatus is the video camera, a pulsed signal as above cannot be stored as a signal independent of image data. By arranging signal receiver 120X within a field of view of the video camera, change (turn-on/turn-off) of the light emitter is recorded in successive image frames. Therefore, measurement data can be synchronized based on timing of change of the light emitter.

Measurement apparatuses 130A and 130B are each, for example, an environmental sensor that detects a state of an environment where a subject or an object is located, such as an air temperature, an air pressure, a humidity, and noise and/or a biological sensor that detects a state of a subject such as a body temperature, pulses, respiration, a heart rate, brain waves, a line of sight, brain blood flow, and an acceleration. Each of measurement apparatuses 130A and 130B includes a CPU (central processing unit) 131, a detector 132, and storage device 133. CPU 131 is a control device that controls measurement apparatus 130 in a centralized manner. In each of measurement apparatuses 130A and 130B, data detected by detector 132 is stored in storage device 133. In measurement apparatuses 130A and 130B, the marker signals transmitted from signal receivers 120A and 120B are stored in storage devices 133 together with measurement data, respectively.

Measurement apparatuses 130A and 130B can communicate with data processing apparatus 150. In the example in FIG. 1, measurement apparatus 130A transmits the stored measurement data and marker signal to data processing apparatus 150 through wired communication. Measurement apparatus 130B transmits the measurement data and the marker signal to data processing apparatus 150 through wireless communication.

Video cameras 130X and 130Y each include an image pick-up unit (image sensor) 135 and a storage device 136. Each of video cameras 130X and 130Y causes storage device 136 to store image data of operations of the subject or the object to be observed obtained by image pick-up unit 135. Video cameras 130X and 130Y each obtain, for example, images of working scenes of the subject shot from a plurality of angles, images of facial expressions of the subject, and images of change of a pupil of the subject.

Image data stored in storage device 136 is taken out to a removable external storage medium 140 such as a memory card, and read into data processing apparatus 150. The measurement data may be transferred from the video camera to data processing apparatus 150 through wired communication or wireless communication as in measurement apparatuses 130A and 130B described above.

Each measurement apparatus 130 is provided with storage device 133 or 136 therein. Means for signal transmission between detector 132 and image pick-up unit 135 that obtain data and respective storage devices 133 and 136 is implemented by wired communication. In wireless data transmission, possibility of data missing becomes higher. Therefore, by transmitting data through a wire between a data obtaining unit and the storage device, data loss of the measurement data and the marker signal can be suppressed.

Data processing apparatus 150 includes a CPU 151 and a storage device 152. Data processing apparatus 150 obtains measurement data from each measurement apparatus 130 through communication or an external storage medium. Data processing apparatus 150 performs synchronization processing such that periods during which pieces of measurement data are obtained match with each other based on the marker signals transmitted together with the pieces of measurement data. Data processing apparatus 150 causes display 160 to show processed measurement data. A user of data measurement system 10 can use data shown on display 160 to analyze how the state of the subject changes with the occurred event.

Though FIG. 1 shows signal receiver 120 as a device independent of measurement apparatus 130, measurement apparatus 130 may include a function of signal receiver 120. When measurement apparatus 130 is a dedicated device adapted to the system in the present embodiment, the signal receiver and the measurement apparatus are more preferably configured as being integrated with each other. A general-purpose measurement apparatus, on the other hand, could readily be applied to the present system by employing a separate signal receiver.

Any measurement apparatus 130 may include a function of signal transmitter 110. In this case, by performing an operation to start (quit) measurement in the measurement apparatus including the function of the signal transmitter, measurement in another measurement apparatus and storage of data therein can be started (quitted) in response thereto.

In order to synchronize pieces of measurement data obtained by a plurality of measurement apparatuses on a time-series basis as such, for example, a time stamp based on a time counting function of each measurement apparatus may be referred to and the obtained measurement data may be synchronized based on identicalness of time indicated by the time stamps. In this case, all measurement apparatuses rarely match in time with each other, and not little offset of time from actual time may be caused in the measurement apparatuses.

In addition, regarding also a clock frequency of a clock signal for a time counting function of each measurement apparatus, there may be not little error in clock frequency of an oscillator for generating a clock signal. Therefore, even when there is no offset of start time between measurement apparatuses, time indicated by the same clock number may be different for each measurement apparatus. Then, even when the measurement apparatuses match in start time with each other, in particular as a measurement period is longer, deviation in time between pieces of measurement data may become larger and a degree of association (accuracy in synchronization) between pieces of data may lower.

In data measurement system 10 according to the present embodiment, each measurement apparatus adopts an approach to storage of the marker signal based on the trigger signal simultaneously transmitted from signal transmitter 110 together with measurement data and synchronization between pieces of measurement data based on the marker signal (start signal) at the time of start of the subject measurement period and the marker signal at the time of end (end signal) in data processing apparatus 150. According to such a configuration, even though there is an error in time stamp or clock cycle between measurement apparatuses, a difference in relative time between two marker signals recognized in each measurement apparatus is at least equal to or shorter than one control cycle in each measurement apparatus. Therefore, accuracy in synchronization between pieces of data within the subject measurement period can be enhanced by synchronization processing as in the present embodiment.

Description of Synchronization Processing

Figure 2:
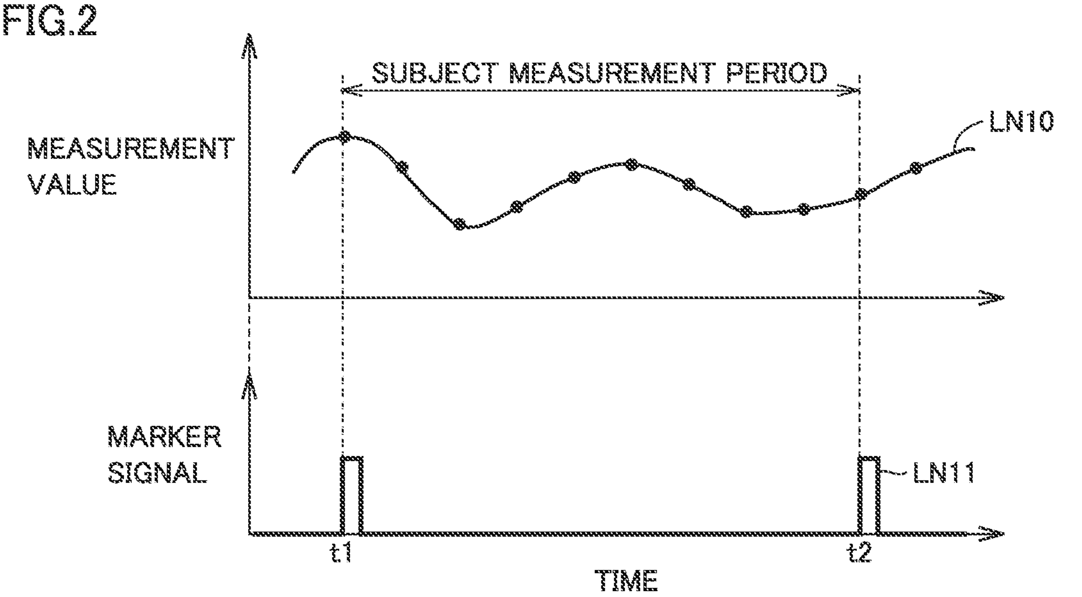
FIG. 2 is a diagram for illustrating relation between measurement data and a marker signal in a measurement apparatus.

FIG. 2 is a diagram for illustrating relation between measurement data and a marker signal in measurement apparatus 130. An upper tier in FIG. 2 shows a measurement value detected by detector 132 and a lower tier shows a marker signal.

Referring to FIG. 2, at time t1, the marker signal at the time of start is received, and at time t2, the marker signal at the time of end is received (a line LN11). In other words, the subject measurement period is a period between time t1 and time t2. In measurement apparatus 130, measurement data that changes as shown with a line LN10 is sampled at a prescribed sampling rate and stored in storage device 133. At this time, the measurement data and the marker signal are stored in association with the time stamp (time) owing to the time counting function in the device.

Figure 3:
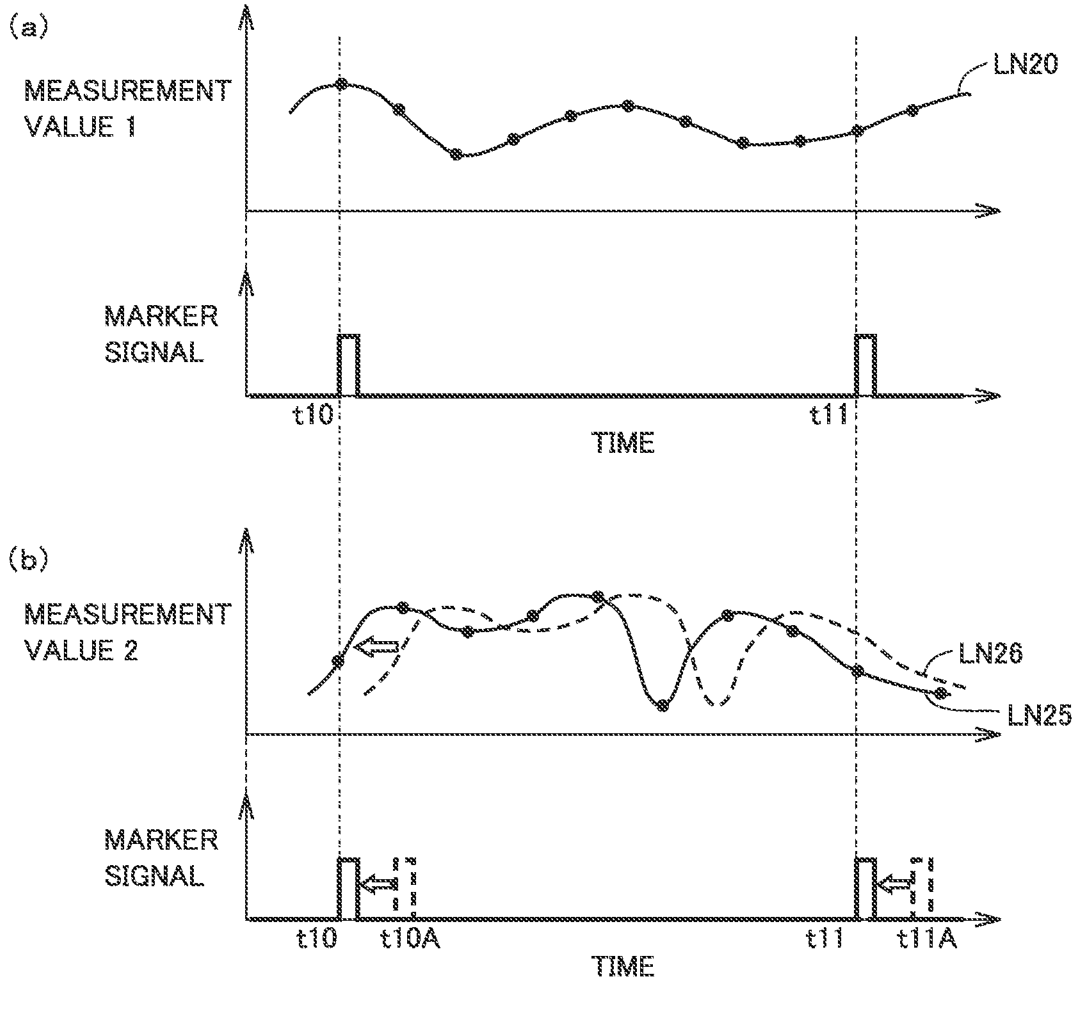
FIG. 3 is a diagram for illustrating relation between each piece of measurement data and a marker signal in an example where a plurality of measurement apparatuses are provided.

FIG. 3 is a diagram for illustrating relation between each piece of measurement data and a marker signal in an example where a plurality of measurement apparatuses are provided. For example, FIG. 3(*a*) shows data in measurement apparatus 130A in FIG. 1 and FIG. 3(*b*) shows data in measurement apparatus 130B in FIG. 1. In the example in FIG. 3, in the time stamp in measurement apparatus 130A, the subject measurement period starts at t10 and ends at t11. In the time stamp in measurement apparatus 130B, the subject measurement period starts at t10A (≠t10) and ends at t11A (≠t11). A duration of the subject measurement period is the same, that is, a duration of a period from time t10 to time t11 is the same as a duration of a period from time t10A to time t11A.

In an example where the measurement apparatuses are thus different from each other in time stamp, even when times indicated in the time stamps of the measurement apparatuses are caused to match with each other, relationship between a measurement value 1 (a solid line LN20 in FIG. 3) of measurement apparatus 130A and a measurement value 2 (a dashed line LN26 in FIG. 3) of measurement apparatus 130B is not correct. In synchronization processing in the present embodiment, start marker signals (start signal) are caused to match with each other and end marker signals (end signals) are caused to match with each other (a solid line LN25 in FIG. 3). Accuracy in synchronization of measurement data within the subject measurement period can thus be enhanced.

Figure 4:
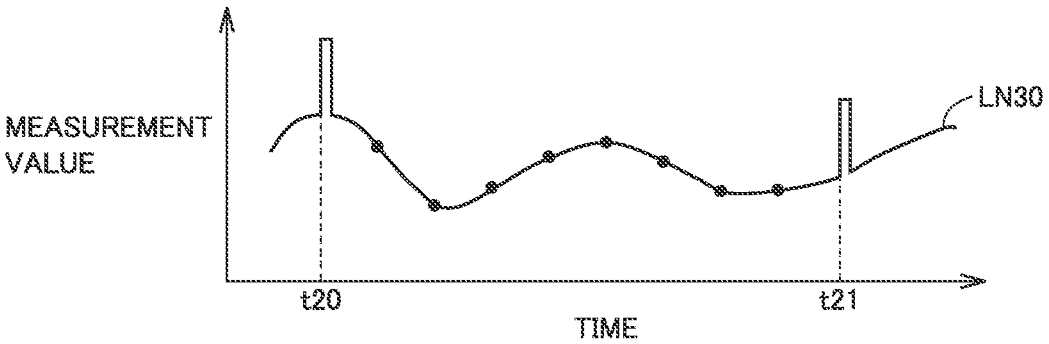
FIG. 4 is a diagram showing an exemplary waveform when a marker signal is superimposed on measurement data.

Though an example in which measurement apparatus 130 is configured such that a marker signal from signal receiver 120 can be stored through an individual channel different from a channel for measurement data is described with reference to FIGS. 2 and 3, specifications of some measurement apparatuses 130 may not allow input of an external signal. In such a case, as shown with a line LN30 in FIG. 4, the marker signal may be superimposed on measurement data such that start/end of the subject measurement period is stored.

Synchronization processing in an example where video camera 130X serves as the measurement apparatus will now be described with reference to FIG. 5. In the case of the video camera, generally, the marker signal cannot be stored through another channel as in FIG. 2. Therefore, signal receiver 120X with a light emission function is arranged within a range of image pick-up by the camera as described above and synchronization processing is performed based on a state of light emission by signal receiver 120X.

Figure 5:
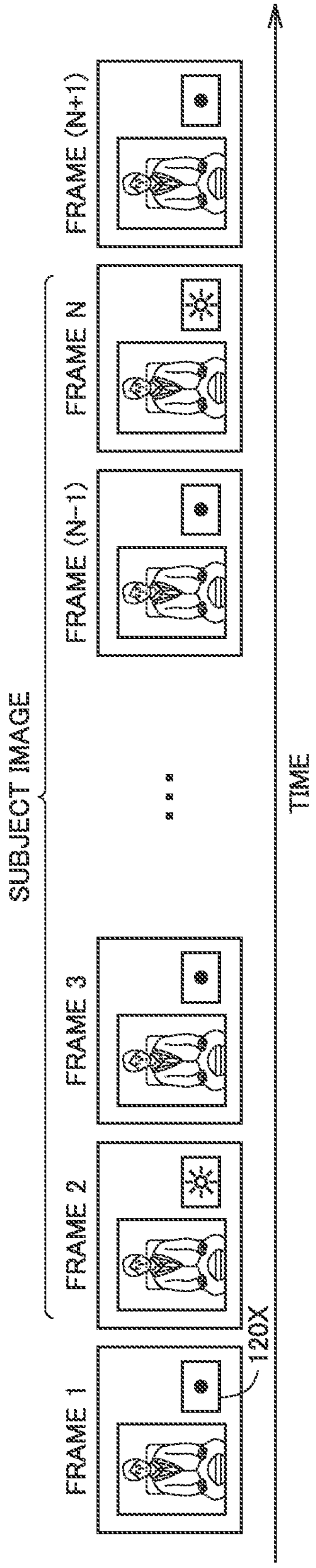
FIG. 5 is a diagram for illustrating a marker signal in a camera image.

Referring to FIG. 5, generally, in the video camera, moving images are recorded as a series of still images shot successively at a prescribed frame rate. FIG. 5 shows images from a frame 1 to a frame (N+1) on a time-series basis. In each recorded image, signal receiver 120X is arranged within the range of image pick-up and the state of light emission by the light emitter of signal receiver 120X can be recognized therein.

In the example in FIG. 5, signal receiver 120X is emitting light in a frame 2 and a frame N. In other words, a start trigger signal is received at time when frame 2 is shot and an end trigger signal is received at time when frame N is shot. Therefore, a period from frame 2 to frame N is the subject measurement period. Then, in data processing apparatus 150, frame 2 is linked to the start signal of another measurement apparatus (for example, time t10 in FIG. 3) and frame N is linked to the end signal (time t11 in FIG. 3). Image data (frame 2 to frame N) within the subject measurement period obtained by video camera 130X can thus be synchronized with measurement data from measurement apparatus 130A.

Though the example in FIG. 5 is configured to recognize the trigger signal based on a light emitting state of the light emitter within the image, audio data can also be recorded together with image data in the video camera and hence the trigger signal may be recognized based on an audio signal. In this case, a signal receiver capable of outputting a specific audio signal such as a beep sound is employed to output the audio signal in response to reception of the trigger signal. Then, based on the timing when the audio signal is recorded in the audio data, determination as to start and end of the subject measurement period is made in data processing apparatus 150 for synchronization with another piece of measurement data. Synchronization processing may thus be performed with the use of the audio signal. Such synchronization processing with the use of the state of the light emitter and/or recording of the audio signal in the video camera also corresponds to superimposition of the marker signal (the state of the light emitter and the audio signal) on measurement data (image data).

Figure 6:
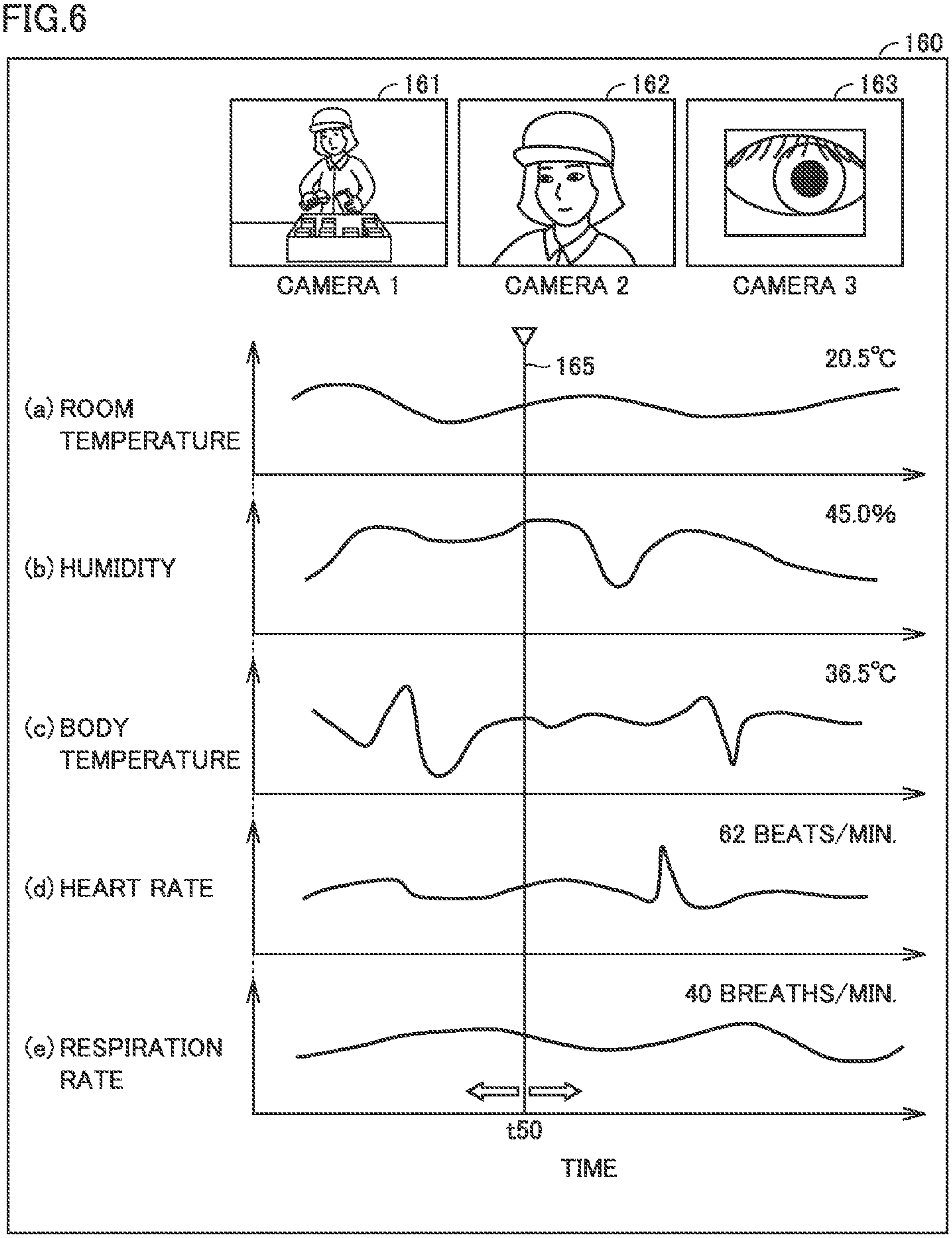
FIG. 6 shows exemplary representation in the data measurement system.

FIG. 6 shows exemplary representation on display 160 in data measurement system 10 in the present embodiment. FIG. 6 shows in an upper tier, image data 161, 162, and 163 shot by three video cameras and shows in a lower tier, measurement data (a) to (e) detected by the measurement apparatuses (environmental sensor/biological sensor).

In the example in FIG. 6, image data 161 is an image from a camera 1 that shoots a state of works by a worker (subject). Image data 162 is an image from a camera 2 that shoots a facial expression of the worker. Image data 163 is an image from a camera 3 that shoots a state of a pupil of the worker.

As measurement data, (a) a room temperature, (b) a humidity, (c) a body temperature, (d) a heart rate, and (e) a respiration rate are shown. The image data and the measurement data are brought in correspondence by synchronization processing described with reference to FIGS. 3 and 5. FIG. 6 shows data at time t50 with a cursor 165. By moving cursor 165 with a not-shown operation portion (for example, a keyboard or a mouse) of display 160, an image and a value of each of pieces of measurement data corresponding to time shown with cursor 165 are shown. With such representation, an event that occurs in the worker as well as an ambient state and a biological state at that time can be analyzed in association.

Modification

The above embodiment describes an example in which measurement apparatuses match with each other in interval between the start marker signal and the end marker signal recognized in the measurement apparatuses, that is, subject measurement period. In this case, even when the measurement apparatuses are slightly different from each other in sampling rate, it can be ensured that the measurement values are obtained within that subject measurement period.

Depending on a difference in sampling rate between the measurement apparatuses, however, timing of recognition of the marker signal may be different and subject measurement time may be different for each measurement apparatus. Then, measurement values may not appropriately be brought in correspondence.

Then, in the present modification, a configuration in which, when there is a difference in subject measurement period due to difference in recognition of the marker signal as above, an interval between time stamps of stored measurement values is corrected and measurement values are appropriately brought in correspondence will be described.

Figure 7:
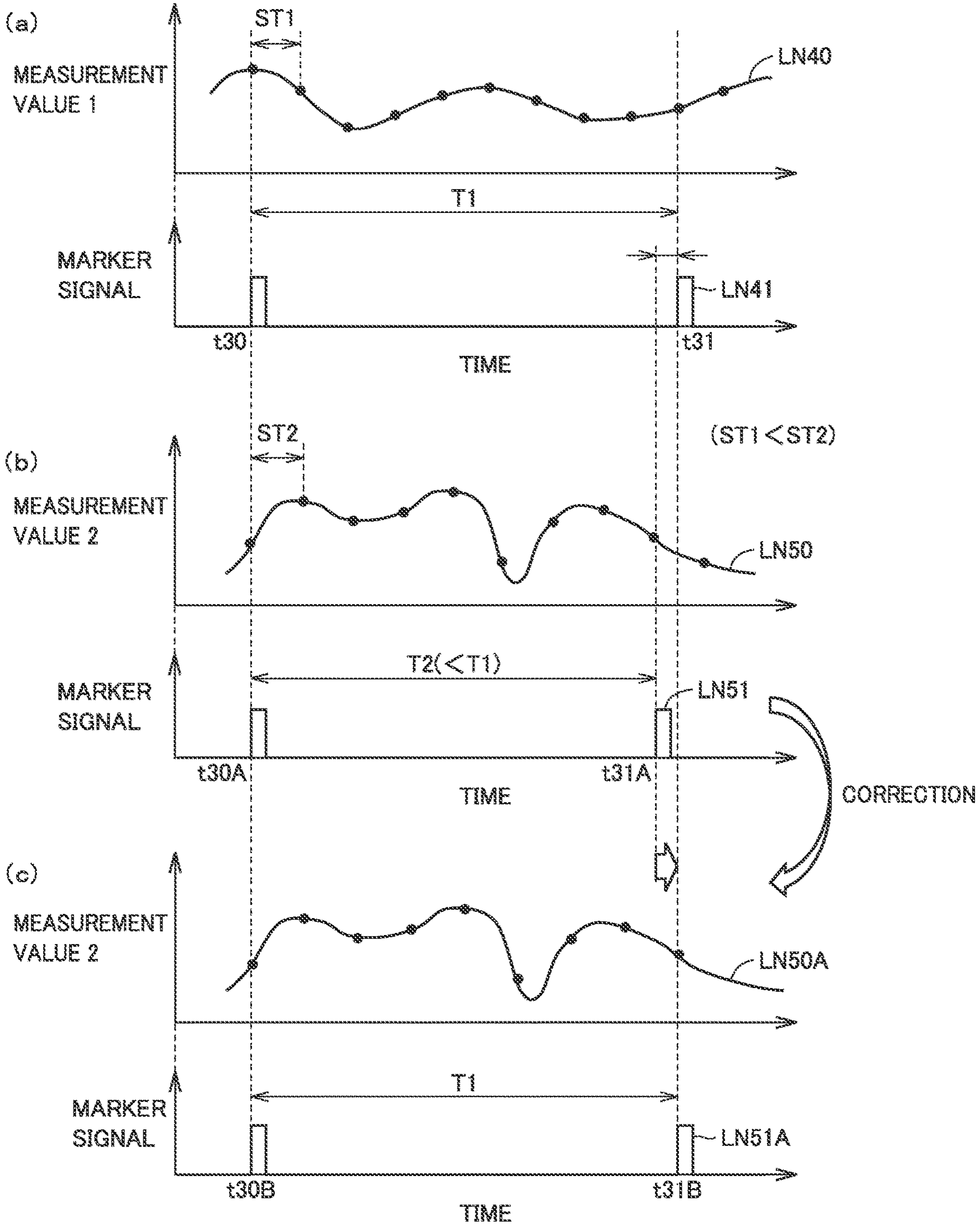
FIG. 7 is a diagram for illustrating correction processing when timings of marker signals in two pieces of measurement data do not match with each other.

FIG. 7 is a diagram for illustrating correction processing when timings of marker signals in two pieces of measurement data do not match with each other. FIG. 7 shows in (a) in an upper tier, the measurement value and the marker signal measured in measurement apparatus 130A, shows in (b) in a middle tier, the measurement value and the marker signal measured in measurement apparatus 130B, and shows in (c) in a lower tier, the measurement value and the marker signal in measurement apparatus 130B subjected to correction processing. FIGS. 7(*a*) to (*c*) show that timings of the start signals (time t30, t30A, and t30B) match with one another.

Referring to FIG. 7, measurement apparatus 130A samples a measurement value at a sampling rate ST1 and the subject measurement period from the start signal (time t30) to the end signal (time t31) lasts for T1 (a line LN41 in FIG. 7(*a*)).

Measurement apparatus 130B samples a measurement value at a sampling rate ST2 (>ST1) lower than that in measurement apparatus 130A. In other words, measurement apparatus 130B is smaller than measurement apparatus 130A in number of times of sampling of the measurement value during a specific period. In this case, in measurement apparatus 130B, at the timing of sampling at time t31A after detection of the start signal and before expiration of period T1, the end signal may be detected (a line LN51 in FIG. 7(*b*)). A subject measurement period T2 in this case is shorter than subject measurement period T1 recognized by measurement apparatus 130A (T2<T1).

In such a state, measurement values obtained by the measurement apparatuses may not appropriately be brought in correspondence on a time-series basis. Therefore, data processing apparatus 150 performs processing for correcting the subject measurement period and an interval of sampling of the measurement values in another measurement apparatus for matching with the subject measurement period of the measurement apparatus largest in number of times of sampling of the measurement value (that is, the measurement apparatus highest in sampling rate) during the subject measurement period recognized by the measurement apparatuses.

In the example in FIG. 7, the interval of sampling of the measurement values is corrected (a line LN50A in FIG. 7(*c*)) such that subject measurement period T2 for measurement data from measurement apparatus 130B matches with subject measurement period T1 of measurement apparatus 130A (a line LN51A in FIG. 7(*c*)). Thus, even when measurement apparatuses different in sampling rate are used, pieces of measurement data can be synchronized with each other.

The example in FIG. 7 describes an example in which subject measurement period T2 recognized by measurement apparatus 130B is shorter than subject measurement period T1 recognized by measurement apparatus 130A. Depending on timing of issuance of the marker signal, however, detection of the end marker signal in measurement apparatus 130B may be later than in measurement apparatus 130A (that is, T2>T1). In this case as well, when measurement apparatus 130A is larger than measurement apparatus 130B in number of times of sampling within the recognized subject measurement period, the interval of sampling of measurement data in measurement apparatus 130B is modified to shorten subject measurement period T2 in measurement apparatus 130B to subject measurement period T1.

The above explanation describes an example in which the sampling rate for detecting measurement data is equal to the sampling rate for detecting the marker signal in measurement apparatuses. In a measurement apparatus lower in sampling rate of the measurement data, on the other hand, the sampling rate for detecting the marker signal may be set to be higher than the sampling rate for detecting measurement data to thereby improve accuracy in detection of the marker signal. Thus, difference in subject measurement period from another measurement apparatus can be lessened.

Control in Data Measurement System

Figure 8:
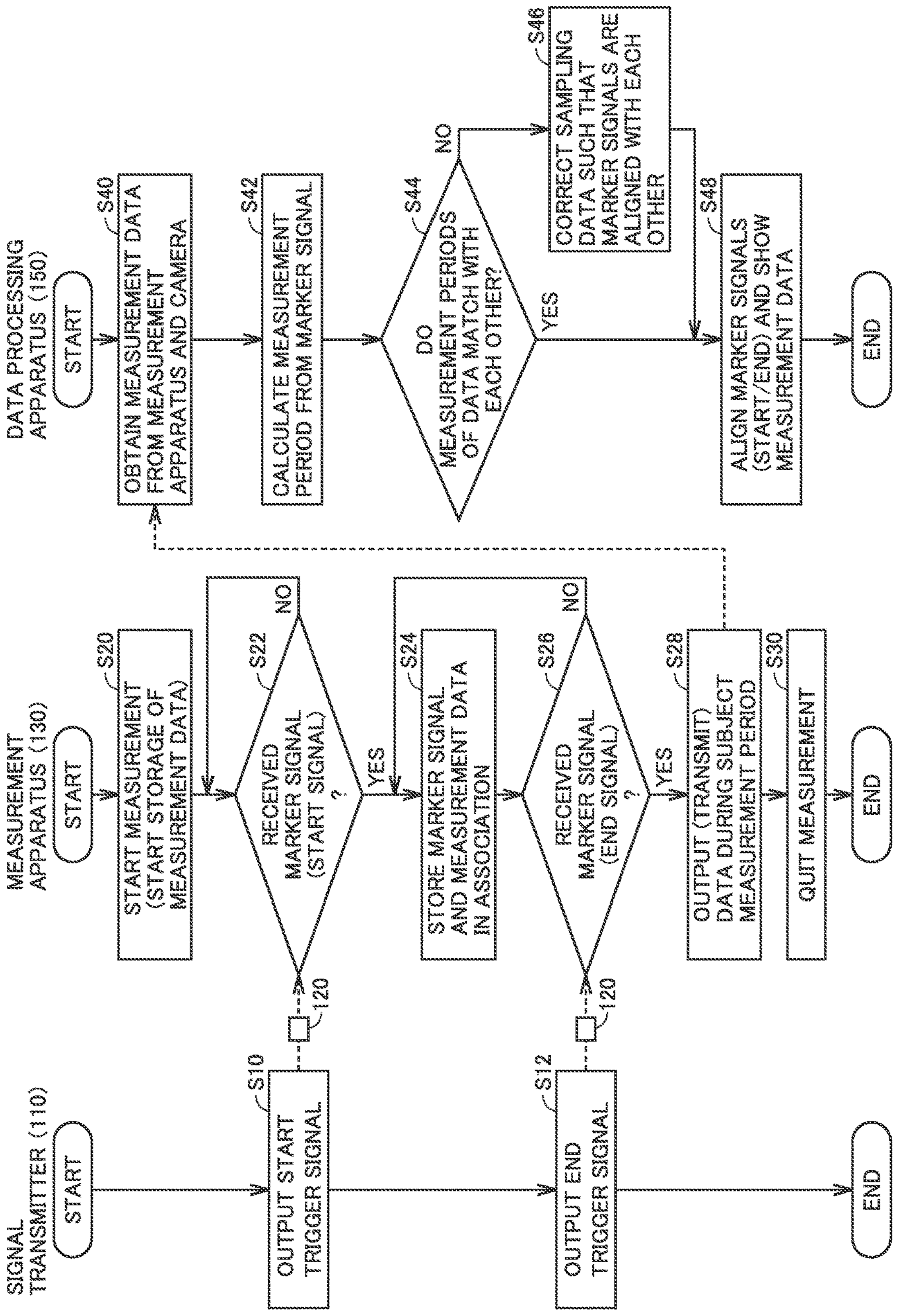
FIG. 8 is a flowchart for illustrating processing in each device in the data measurement system.

FIG. 8 is a flowchart for illustrating processing in each device in the data measurement system according to the present embodiment. The flowchart in FIG. 8 includes processing including correction processing in the modification.

Referring to FIG. 8, in a step (the step being abbreviated as S below) 10, at timing of an operation by a user or at prescribed timing registered in advance in signal transmitter 110, signal transmitter 10 broadcasts the trigger signal indicating start (start trigger signal) of the subject measurement period.

Signal transmitter 110 broadcasts the trigger signal indicating end (end trigger signal) of the subject measurement period at timing of an operation by the user or the timing when a predetermined period has elapsed since issuance of the start signal (S12).

In measurement apparatus 130, in S20, in response to the operation by the user, measurement processing is started and storage of measurement data in storage device 133 is started. Though measurement processing in measurement apparatus 130 is preferably started prior to reception of the marker signal from signal receiver 120, it may be started in response to reception of the marker signal in S22.

In S22, measurement apparatus 130 determines whether or not it has received the marker signal (start signal) transmitted from signal receiver 120 in response to the trigger signal from signal transmitter 110. When measurement apparatus 130 has not received the marker signal (start signal) (NO in S22), the process returns to S22 and measurement apparatus 130 waits for reception of the marker signal while it continues measurement processing.

When measurement apparatus 130 has received the marker signal (start signal) (YES in S22), the process proceeds to S24 and measurement apparatus 130 causes storage device 133 to store the received marker signal in association with measurement data. Then, in S26, measurement apparatus 130 determines whether or not it has received the marker signal indicating end (end signal) of measurement from signal receiver 120. When measurement apparatus 130 has not received the marker signal (end signal) from signal receiver 120 (NO in S26), the process proceeds to S24 and measurement apparatus 130 continues storage of measurement data at a prescribed sampling rate.

When measurement apparatus 130 has received the marker signal (end signal) from signal receiver 120 (YES in S26), the process proceeds to S28 and measurement apparatus 130 outputs measurement data and the data on the marker signal during the subject measurement period from the start signal until the end signal to data processing apparatus 150. Thereafter, measurement apparatus 130 stops measurement processing in response to an operation by the user or the like (S30).

When data stored in measurement apparatus 130 is read into data processing apparatus 150 by means of an external storage device, step S28 is skipped. When video camera 130X or 130Y serves as the measurement apparatus, the marker signal is recorded as a light emission signal in image data and hence determination as to reception of the marker signal as in S22 and S26 may not be made. In such a case, the entire image data during the measurement period is read into data processing apparatus 150 and synchronization processing is performed in data processing apparatus 150 automatically or in response to an operation by the user.

When measurement processing is performed over a long period, influence by the difference in sampling rate between measurement apparatuses 130 increases with measurement time. In such a case, data within the entire measurement period is divided into data for a shorter period and the shorter data is transmitted to data processing apparatus 150 so that influence by the difference in sampling rate is preferably lessened. In this case, in measurement apparatus 130, in parallel to transmission of the measurement data to data processing apparatus 150 in S28 in FIG. 7, storage of the measurement data and the marker signal in S24 is continued. Each time the marker signal is transmitted from signal receiver 120, the measurement data and the data on the marker signal stored after previous reception of the marker signal are transmitted to data processing apparatus 150.

By thus dividing measurement data and transmitting divided data to data processing apparatus 150 for processing, synchronization processing for measurement data from measurement apparatuses 130 is performed in a unit of a block of transmitted measurement data. Therefore, even in the case of measurement over a long period, accuracy in synchronization of data can be maintained.

Processing in data processing apparatus 150 will now be described. In S40, data processing apparatus 150 obtains measurement data and image data from measurement apparatus 130. In S42, data processing apparatus 150 calculates a measurement period between adjacent marker signals included in the obtained data based on the marker signals. Then, in S44, data processing apparatus 150 determines whether or not durations of the measurement periods calculated for pieces of measurement data from measurement apparatuses 130 match with each other.

When the durations of the measurement periods of measurement apparatuses 130 match with each other (YES in S44), the process proceeds to S48. Data processing apparatus 150 aligns the start signals with each other and aligns the end signals with each other for the pieces of measurement data from measurement apparatuses 130 and provides representation on display 160 as shown in FIG. 6. The user analyzes operations of the subject based on the representation.

When there is a measurement apparatus that does not match in duration of the measurement period (NO in S44), the process proceeds to S46 and data processing apparatus 150 performs correction processing as described with reference to FIG. 7. Thereafter, the process proceeds to S48 and representation on display 160 is provided while pieces of measurement data are synchronized with each other as described above.

As each device is controlled in accordance with processing as above, in the data measurement system including a plurality of measurement apparatuses, pieces of measured data can be presented as being appropriately synchronized with each other. Accuracy in synchronization between a plurality of pieces of measurement data can thus be improved and accuracy in analysis of cause-and-effect relation thereof can be improved.

Aspects (Clause 1) A data measurement system according to one aspect includes a plurality of measurement apparatuses, a transmitter, and a data processing apparatus. The transmitter transmits a first signal to the plurality of measurement apparatuses. The data processing apparatus presents to a user, data obtained from the plurality of measurement apparatuses. The data processing apparatus obtains from each of the plurality of measurement apparatuses, measurement data measured during a period between a start signal corresponding to the first signal transmitted at first time and an end signal corresponding to the first signal transmitted at second time later than the first time. The data processing apparatus temporally aligns start signals in the obtained data with each other and end signals in the obtained data with each other, and presents the measurement data from the plurality of measurement apparatuses to the user.

According to the data measurement system described in Clause 1, measurement data during a period from the start signal to the end signal based on the first signal from a common transmitter is obtained from each measurement apparatus, and pieces of obtained measurement data are presented to the user with the start signals being temporally aligned with each other and with the end signals being temporally aligned with each other. By thus aligning the pieces of measurement data with each other with the start signal and the end signal being defined as the reference to synchronize the plurality of pieces of measurement data on a time-series basis in the measurement apparatuses, synchronicity of the measurement data can be ensured. In addition, in particular in measurement lasting for a long period of time, synchronization processing is successively performed by transmission of the first signal at appropriate intervals, so that influence by difference in sampling rate or deviation of a clock signal can be lessened. Furthermore, by using the first signal in common, a commercially available sensor or the like could be employed for a measurement apparatus with an external input, and hence a system can relatively readily be constructed.

(Clause 2) The data measurement system described in Clause 1 further includes a display on which the measurement data from the plurality of measurement apparatuses is shown to the user.

According to the data measurement system described in Clause 2, the user can conduct observation and analysis with the use of the measurement data shown on the display.

(Clause 3) In the data measurement system described in Clause 1 or 2, the plurality of measurement apparatuses include a first apparatus and a second apparatus. When a first interval from the start signal to the end signal in the first apparatus is different from a second interval from the start signal to the end signal in the second apparatus, the data processing apparatus corrects the measurement data from the second apparatus such that the second interval is equal to the first interval.

According to the data measurement system described in Clause 3, when the interval between the start signal and the end signal is different due to difference in sampling rate between the measurement apparatuses, the measurement data shorter in interval is corrected and synchronization process of the measurement data is performed. Accuracy in synchronization between pieces of measurement data can thus be enhanced.

(Clause 4) In the data measurement system described in any one of Clauses 1 to 3, the transmitter is included in any of the plurality of measurement apparatuses.

According to the data measurement system described in Clause 4, one of the plurality of measurement apparatuses performs a function of the transmitter. Therefore, the system can be constructed without separately preparing the transmitter.

(Clause 5) In the data measurement system described in any one of Clauses 1 to 3, the transmitter is included in the data processing apparatus.

According to the data measurement system described in Clause 5, the data processing apparatus performs a function of the transmitter. Therefore, the system can be constructed without separately preparing the transmitter.

(Clause 6) In the data measurement system described in any one of Clauses 1 to 5, each of the plurality of measurement apparatuses includes any sensor of an environmental sensor that measures environmental information, a biological sensor that measures biological information, and an image sensor for imaging.

According to the data measurement system described in Clause 6, the environmental sensor, the biological sensor, and the image sensor (camera) can be employed as the measurement apparatus.

(Clause 7) In the data measurement system described in Clause 6, each of the plurality of measurement apparatuses includes a storage device where the measurement data measured thereby is stored, and performs means for transmission of a signal from the sensor to the storage device through a wire.

According to the data measurement system described in Clause 7, each measurement apparatus does not use wireless communication as means for signal transmission from the sensor to the storage device. In wireless communication, data may sometimes be lost. Storage of measurement data in the storage device through wired communication, however, can reduce data loss.

(Clause 8) In the data measurement system described in any one of Clauses 1 to 7, in each of the plurality of measurement apparatuses, a sampling rate of a second signal is equal to or higher than a sampling rate of the measurement data.

According to the data measurement system described in Clause 8, the sampling rate of the second signal used for processing for synchronization with another piece of measurement data is set to be equal to or higher than sampling rate of the measurement data. A measurement apparatus may relatively be lower in sampling rate of the measurement data, and sampling of the second signal at that sampling rate may increase deviation from the second signal in another measurement apparatus and accuracy in synchronization may lower. Therefore, when the sampling rate of the measurement data is relatively low, the sampling rate of the second signal is set to be higher than the sampling rate of the measurement data to thereby suppress lowering in accuracy of synchronization.

(Clause 9) In the data measurement system described in any one of Clauses 1 to 8, the transmitter transmits the first signal through wireless communication.

According to the data measurement system described in Clause 9, the transmitter broadcasts the first signal through wireless communication. Since a connecting line between the transmitter and the receiver is not necessary, construction of the system is simplified.

(Clause 10) In the data measurement system described in any one of Clauses 1 to 9, a first signal is stored as being integrated with the measurement data.

According to the data measurement system described in Clause 10, when the measurement data and the first signal cannot be stored as independent signals in the measurement apparatus, the first signal can be stored by being superimposed on the measurement data, or in the case of the camera, by being recorded in imaging data.

(Clause 11) The data measurement system described in Clause 1 further includes at least one receiver that transmits a second signal to a corresponding measurement apparatus among the plurality of measurement apparatuses in response to reception of the first signal transmitted from the transmitter. The start signal is the second signal corresponding to the first signal transmitted at the first time. The end signal is the second signal corresponding to the first signal transmitted at the second time.

According to the data measurement system described in Clause 11, the receiver that converts the first signal from the transmitter to the second signal is used. Then, a commercially available sensor or the like could be used for a measurement apparatus with an external input in the data measurement system. Therefore, a system can relatively readily be constructed.

(Clause 12) A measurement apparatus according to another aspect is used in the data measurement system described in Clause 1. The measurement apparatus includes a transmitter.

(Clause 13) A transmitter according to another aspect is used in the data measurement system described in any one of Clauses 1 to 12.

(Clause 14) A receiver according to another aspect is used in the data measurement system described in any one of Clauses 1 to 12.

(Clause 15) A data processing apparatus according to another aspect is used in the data measurement system described in any one of Clauses 1 to 12.

(Clause 16) A method according to another aspect relates to a method of presenting measurement data to a user in a data measurement system including a plurality of measurement apparatuses. The data measurement system includes a transmitter and a data processing apparatus. The method includes i) transmitting, by the transmitter, a first signal to the plurality of measurement apparatuses, ii) obtaining, by the data processing apparatus, from each of the plurality of measurement apparatuses, measurement data measured during a period between a start signal corresponding to the first signal transmitted at first time and an end signal corresponding to the first signal transmitted at second time later than the first time, and iii) temporally aligning, by the data processing apparatus, start signals in the obtained data with each other and end signals in the obtained data with each other and presenting the measurement data from the plurality of measurement apparatuses to the user.

According to the method described in Clause 16, measurement data during a period from the start signal to the end signal based on the first signal from a common transmitter is obtained from each measurement apparatus, and pieces of obtained measurement data are presented to the user with the start signals being temporally aligned with each other and with the end signals being temporally aligned with each other. By thus aligning the pieces of measurement data with each other with the start signal and the end signal being defined as the reference to synchronize the plurality of pieces of measurement data on a time-series basis in the measurement apparatuses, synchronicity of the measurement data can be ensured. In addition, in particular in measurement lasting for a long period of time, synchronization processing is successively performed by transmission of the first signal at appropriate intervals, so that influence by difference in sampling rate or deviation of a clock signal can be lessened. Furthermore, by using the first signal in common, a commercially available sensor or the like could be employed for a measurement apparatus with an external input, and hence a system can relatively readily be constructed.

It should be understood that the embodiments disclosed herein are illustrative and non-restrictive in every respect. The present invention is defined by the terms of the claims rather than the description of the embodiments above and is intended to include any modifications within the scope and meaning equivalent to the terms of the claims.

REFERENCE SIGNS LIST

10 data measurement system; 110 signal transmitter; 120, 120A, 120B, 120X signal receiver; 130, 130A, 130B measurement apparatus; 130X, 130Y video camera; 131, 151 CPU; 132 detector; 133, 136, 152 storage device; 135 image pick-up unit; 140 external storage medium; 150 data processing apparatus; 160 display

The invention claimed is:

1. A data measurement system comprising:
- a plurality of measurement apparatuses including a first apparatus and a second apparatus;
- a transmitter that transmits a trigger signal to the plurality of measurement apparatuses; and
- a data processing apparatus that processes data obtained from the plurality of measurement apparatuses,
- wherein each of the plurality of measurement apparatuses:
  - receives marker signals, each of which is the trigger signal or which is output in response to reception of the trigger signal,
  - obtains measurement data before and after a time when the marker signals are received, and
  - stores the marker signals independently of the obtained measurement data or as being superimposed on the obtained measurement data,
- wherein the data processing apparatus:
  - obtains from each of the plurality of measurement apparatuses, measurement data measured during a period between a start signal and an end signal, wherein the start signal is a marker signal which is the trigger signal transmitted at a first time or which is output in response to reception of the trigger signal transmitted at the first time, and wherein the end signal is a marker signal which is the trigger signal transmitted at a second time later than the first time or which is output in response to reception of the trigger signal transmitted at the second time,
  - temporally aligns the start signals in the obtained data with each other and aligns the end signals in the obtained data with each other such that a first interval from the start signal to the end signal in the first apparatus matches a second interval from the start signal to the end signal in the second apparatus, and
  - presents the measurement data from the plurality of measurement apparatuses to a user in a form such that the measurement data obtained from the plurality of measurement apparatuses are visually aligned based on the start signals and the end signals,
- wherein each of the plurality of measurement apparatuses includes any sensor of an environmental sensor that measures environmental information, a biological sensor that measures biological information, and an image sensor for imaging, and
- wherein the measurement data obtained from the plurality of measurement apparatuses include at least two kinds of data among the environmental sensor, the biological sensor and the image sensor.

2. The data measurement system according to claim 1, further comprising a display on which the measurement data from the plurality of measurement apparatuses is shown to the user.

3. The data measurement system according to claim 1, wherein when the first interval is different from the second interval, the data processing apparatus corrects the measurement data from the second apparatus such that the second interval is equal to the first interval.

4. The data measurement system according to claim 1, wherein the transmitter is included in any of the plurality of measurement apparatuses or in the data processing apparatus.

5. The data measurement system according to claim 1, wherein
- each of the plurality of measurement apparatuses includes a storage device where the measurement data measured thereby is stored, and performs means for transmission of a signal from the sensor to the storage device through a wire.

6. The data measurement system according to claim 1, wherein in each of the plurality of measurement apparatuses, a sampling rate of the marker signals is equal to or higher than a sampling rate of the measurement data.

7. The data measurement system according to claim 1, wherein the marker signals are stored to be integrated with the measurement data.

8. The data measurement system according to claim 1, further comprising at least one receiver that transmits a marker signal to a corresponding measurement apparatus among the plurality of measurement apparatuses in response to reception of the trigger signal transmitted from the transmitter.

9. A receiver used in the data measurement system according to claim 8.

10. A transmitter used in the data measurement system according to claim 1.

11. A data processing apparatus used in the data measurement system according to claim 1.

12. A method of processing measurement data in a data measurement system including a plurality of measurement apparatuses, the plurality of measurement apparatuses including a first apparatus and a second apparatus, the data measurement system including a transmitter and a data processing apparatus, the method comprising:
- transmitting, by the transmitter, a trigger signal to the plurality of measurement apparatuses;
- receiving, by each of the plurality of measurement apparatuses, marker signals, each of which is the trigger signal or which is output in response to reception of the trigger signal;
- obtaining, by each of the plurality of measurement apparatuses, measurement data before and after a time when the marker signals are received;
- storing the marker signals independently of the obtained measurement data or as being superimposed on the obtained measurement data;
- obtaining, by the data processing apparatus, from each of the plurality of measurement apparatuses, measurement data measured during a period between a start signal and an end signal, wherein the start signal is a marker signal which is the trigger signal transmitted at a first time or which is output in response to reception of the trigger signal transmitted at the first time, and wherein the end signal is a marker signal which is the trigger signal transmitted at a second time later than the first time or which is output in response to reception of the trigger signal transmitted at the second time;
- temporally aligning, by the data processing apparatus, start signals in the obtained data with each other and end signals in the obtained data with each other such that a first interval from the start signal to the end signal in the first apparatus matches a second interval from the start signal to the end signal in the second apparatus; and presenting the measurement data from the plurality of measurement apparatuses to a user in a form such that the measurement data obtained from the plurality of measurement apparatuses are visually aligned based on the start signals and the end signals, wherein each of the plurality of measurement apparatuses includes any sensor of an environmental sensor that measures environmental information, a biological sensor that measures biological information, and an image sensor for imaging, and wherein the measurement data obtained from the plurality of measurement apparatuses include at least two kinds of data among the environmental sensor, the biological sensor and the image sensor.

* * * * *